US011534958B2

(12) United States Patent
Schadhauser et al.

(10) Patent No.: US 11,534,958 B2
(45) Date of Patent: Dec. 27, 2022

(54) METHOD AND DEVICE FOR THE PRODUCTION OF A FIBRE-REINFORCED PLASTICATE

(71) Applicant: KRAUSSMAFFEI TECHNOLOGIES GMBH, Munich (DE)

(72) Inventors: Maximilian Schadhauser, Unterhaching (DE); Stefan Schierl, Germering (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 66 days.

(21) Appl. No.: 17/260,013

(22) PCT Filed: Jul. 31, 2019

(86) PCT No.: PCT/EP2019/070607
§ 371 (c)(1),
(2) Date: Jan. 13, 2021

(87) PCT Pub. No.: WO2020/025663
PCT Pub. Date: Feb. 6, 2020

(65) Prior Publication Data
US 2021/0268717 A1    Sep. 2, 2021

(30) Foreign Application Priority Data

Aug. 3, 2018  (DE) ..................... 10 2018 118 883.8

(51) Int. Cl.
*B29C 64/118*        (2017.01)
*B33Y 10/00*         (2015.01)
(Continued)

(52) U.S. Cl.
CPC .......... *B29C 64/118* (2017.08); *B29C 64/209* (2017.08); *B29C 64/336* (2017.08);
(Continued)

(58) Field of Classification Search
CPC ... B29C 64/118; B29C 64/209; B29C 64/393; B29C 64/336; B33Y 10/00; B33Y 30/00; B33Y 70/10
(Continued)

(56) References Cited

U.S. PATENT DOCUMENTS 5,110,275 A     5/1992  Scheuring
6,364,518 B1    4/2002  Gleich et al.
(Continued)

FOREIGN PATENT DOCUMENTS

CN    204160774 U    2/2015
DE      4016784 A1  11/1991
(Continued)

OTHER PUBLICATIONS

"Carbon Composites Magazine", Edition 1, 2016, ISSN 2366-8024, pp. 43 and 44.
(Continued)

*Primary Examiner* — Joseph S Del Sole
*Assistant Examiner* — Lawrence D. Hohenbrink, Jr.
(74) *Attorney, Agent, or Firm* — Pearne & Gordon LLP

(57) ABSTRACT

An endless-fibre-reinforced plasticate is described for the additive manufacture of endless-fibre-reinforced plastic components. A plastic material is introduced via a first filling opening into a single-screw extruder and is melted. A mass flow dmF/dt of dry, endless fibre strands is introduced via a second filling opening into the single-screw extruder, impregnated with plastic melt and discharged as fibre-reinforced plasticate. Remote from the second filling opening with regard to conveying, the screw of the single-screw extruder is configured that the fibre strands are discharged substantially undamaged. The mass flow dmF/dt is kept in a first mass flow target ratio to a mass flow dmS/dt of plastic melt discharged from the single-screw extruder, or the mass flow dmF/dt is kept in a second mass flow target ratio to a mass flow dmP/dt of fibre-reinforced plasticate discharged from the single-screw extruder, the exiting endless fibre strands are substantially completely impregnated with plastic melt.

20 Claims, 3 Drawing Sheets

(51) Int. Cl.
    *B33Y 30/00*     (2015.01)
    *B29C 64/209*    (2017.01)
    *B29C 64/393*    (2017.01)
    *B29C 64/336*    (2017.01)
    *B33Y 70/10*     (2020.01)

(52) U.S. Cl.
    CPC ............ *B29C 64/393* (2017.08); *B33Y 10/00* (2014.12); *B33Y 30/00* (2014.12); *B33Y 70/10* (2020.01)

(58) Field of Classification Search
    USPC .......................................... 264/241; 425/375
    See application file for complete search history.

(56) References Cited

U.S. PATENT DOCUMENTS

| | | | |
|---|---|---|---|
| 2003/0003291 A1* | 1/2003 | Shah | B29C 48/297 428/318.6 |
| 2007/0176313 A1 | 8/2007 | Ogawa et al. | |
| 2010/0103763 A1 | 4/2010 | Ponzielli | |
| 2014/0291886 A1 | 10/2014 | Mark et al. | |
| 2017/0066187 A1 | 3/2017 | Mark et al. | |
| 2017/0151728 A1* | 6/2017 | Kune | B29C 64/209 |
| 2018/0126636 A1 | 5/2018 | Jang | |
| 2018/0214909 A1 | 8/2018 | Farmer et al. | |
| 2019/0232550 A1 | 8/2019 | Mark et al. | |

FOREIGN PATENT DOCUMENTS

| | | |
|---|---|---|
| DE | 102006038948 A1 | 2/2008 |
| EP | 1815962 A1 | 8/2007 |
| EP | 2781342 A1 | 9/2014 |
| EP | 3299151 A1 | 3/2018 |
| WO | 2008071782 A2 | 6/2008 |
| WO | 2014153535 A2 | 9/2014 |
| WO | 2015171832 A1 | 11/2015 |

OTHER PUBLICATIONS

International Search Report for PCT/EP2019/070607 dated Nov. 18, 2019.
Written Opinion for PCT/EP2019/070607 dated Nov. 18, 2019.

* cited by examiner

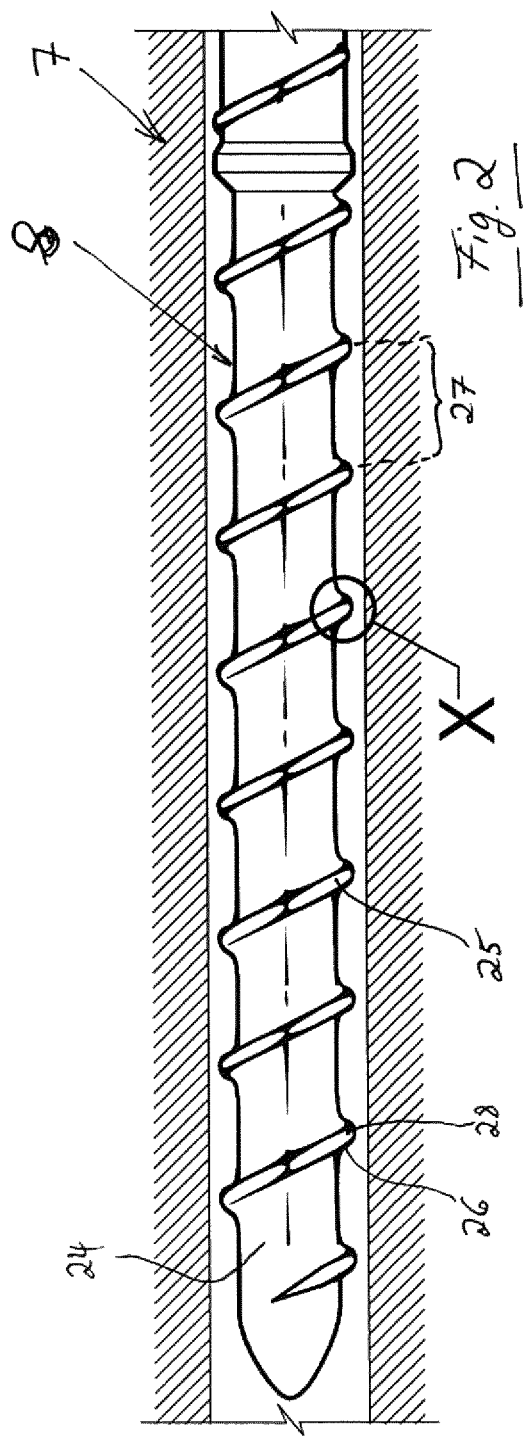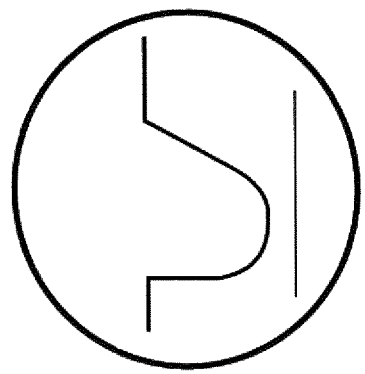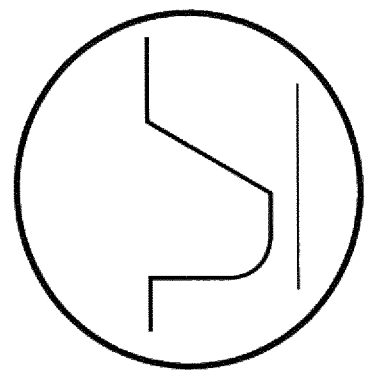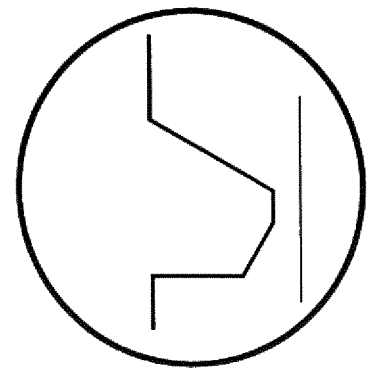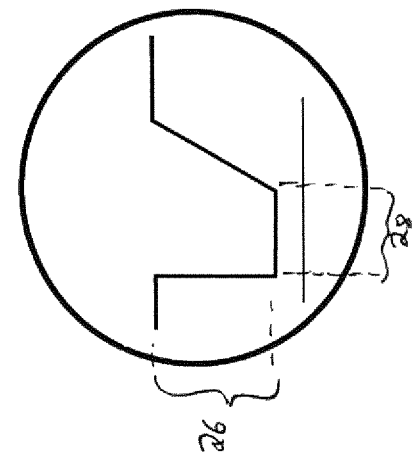

METHOD AND DEVICE FOR THE PRODUCTION OF A FIBRE-REINFORCED PLASTICATE

CROSS-REFERENCE TO RELATED APPLICATIONS

This is a National Stage application of PCT international application PCT/EP2019/070607 filed on Jul. 31, 2019, which claims the priority of German Patent Application No. 10 2018 118 883.8, filed Aug. 3, 2018, which are incorporated herein by reference in their entireties.

FIELD OF THE INVENTION

The invention relates to a method and a device for the production of a fibre-reinforced plasticate. The invention further relates to the use of such a plasticate according to the invention and a device according to the invention for the additive manufacture of fibre-reinforced plastic components.

BACKGROUND OF THE INVENTION

From the prior art, the production of plastic components by means of additive manufacture, the so-called 3D printing, is known in various embodiments. In the so-called Fused Deposition Modelling (FDM; German: Schmelzschichtung) or Fused Filament Fabrication (FFF), a plastic component is built up in layers from a plastic melt by means of a 3D printer. In this respect, reference is to be made, by way of example, to WO2015/171832A1. With the use of plastic granulate or plastic rods, in which fibres are contained, short-fibre-reinforced plastic components can also be produced by means of 3D printing.

From the journal "Carbon Composites Magazine", edition 1/2016, ISSN 2366-8024, pages 43 and 44, it is known to produce endless-fibre-reinforced structures with 35% fibre volume content in 3D printing, by using as starting material a hybrid yarn of glass fibres and polypropylene as reinforcing- and matrix component.

A further variant for the production of endless-fibre-reinforced plastic components is the use of so-called UD tapes. This concerns a comparatively expensive semi-finished product, which is produced in a laborious production method and can only be used thereafter for further processing in the production of endless-fibre-reinforced plastic components.

BRIEF SUMMARY OF THE INVENTION

Proceeding from the above-mentioned prior art, the invention is based on the problem of indicating a method and a device for the production of a fibre-reinforced plasticate which is reinforced with one or more endless fibre strands and which is therefore suitable for the additive manufacture of endless-fibre-reinforced plastic components.

The solution to this problem takes place with regard to the method by the features of claim 1, and with regard to the device by the features of the coordinate claim 10. Advantageous further developments and configurations are found in the dependent claims.

A core idea of the present invention is to be seen in that a plastic material is melted by means of a single-screw extruder, that endless fibre strands are introduced into the plastic melt and these, substantially undamaged and impregnated with plastic melt, are discharged from a nozzle of the single-screw extruder. The single-screw extruder comprises a cylinder and a screw mounted rotatably therein. A plastic material is fed via a first filling opening in the cylinder into the single-screw extruder and is melted therein to a plastic melt. Remote from the first filling opening with regard to conveying, a mass flow $dmF/dt$ of one or more endless fibre strands is introduced via a second filling opening in the cylinder into the single-screw extruder. In the region of the second filling opening, the plastic material is present as a plastic melt. The endless fibre strands are introduced in dry state into the plastic melt and are impregnated with plastic melt. The mixture of fibre strands and plastic melt is discharged as an endless-fibre-reinforced plasticate from a nozzle situated at the remote end of the cylinder with regard to conveying. So that the endless fibre strands, impregnated with plastic melt, exit from the nozzle as undamaged as possible, a screw is used which, remote from the second filling opening with regard to conveying, has a screw geometry which is suitable for this. Preferably, this section of the screw can be configured as a pure conveying screw. There results a mass flow $dmS/dt$ of plastic melt exiting from the nozzle and a mass flow $dmP/dt$ of fibre-reinforced plasticate exiting from the nozzle. The mass flow $dmF/dt$ and the mass flow $dmS/dt$ are to be in a first ratio to one another in which the endless fibre strands exiting from the nozzle are substantially completely impregnated with plastic melt. This first ratio constitutes a first mass flow target ratio which is kept constant over predeterminable periods of time. Alternatively to this first ratio or in addition to this, the mass flow $dmF/dt$ and the mass flow $dmP/dt$ are to be in a second ratio to one another, in which the endless fibre strands exiting from the nozzle are substantially completely impregnated with plastic melt, wherein the second ratio constitutes a second mass flow target ratio which is kept constant over predeterminable periods of time.

By means of the method according to the invention, it is prevented that more plastic melt than fibre material or more fibre material than plastic melt is discharged from the nozzle over predeterminable periods of time. FIG. 3a shows a state in which more plastic melt than fibre material is discharged, and FIG. 3b shows a state in which more fibre material than plastic melt is discharged. In FIG. 3c, a state is illustrated in which the first and/or second mass flow target ratio is present. For better clarity, in FIGS. 3a, 3b and 3c the fibre strand is illustrated as encased with plastic melt. In reality, however, the fibre strand is penetrated by plastic melt. It can also be stated that the fibre strand is impregnated with plastic melt.

If only one single endless fibre strand, impregnated with plastic melt, is to be discharged from the nozzle, the setting of the first and/or second mass flow target ratio can be set and preferably regulated in such a way that the fibre strand exiting form the nozzle has a surface which is coated with plastic melt and is preferably smooth.

When several fibre strands are to be used and several fibre strands impregnated with plastic melt are to be discharged from the nozzle, the setting of the first and/or second mass flow target ratio can be set and preferably regulated in such a way that the impregnated fibre strands exiting form the nozzle respectively have a surface which is coated with plastic melt and is preferably smooth. As a result, therefore an entire bundle of fibre strands can be discharged, wherein each fibre strand in itself is substantially completed impregnated by plastic melt. In the case of the bundle of completely impregnated fibre strands, additional plastic melt can be present in any possibly existing intermediate spaces. Likewise, in the case of the bundle of completely impregnated fibre strands, the bundle as such can have a surface which is coated with plastic melt and is preferably smooth.

In further development of the invention, provision can be made that the first mass flow target ratio and/or the second mass flow target ratio is determined in an upstream learning phase. For this, suitable tests can be run in order to determine a suitable or respectively a correct first ratio of mass flow dmF/dt to melt flow dmS/dt and/or of mass flow dmF/t to plasticate flow dmP/dt.

For example, the learning phase can comprise the following steps:
1. Setting an initial fibre feed speed, which corresponds to the circumferential speed of the screw in the fibre intake zone;
2. Setting an initial plastic mass flow which corresponds to the maximally plasticizable plastic mass flow by the screw which is used;
3. Reducing the fibre feed speed by for example 5% of the initial fibre feed speed
4. Repeating the previous step until the discharged fibre/plastic strand has a smooth surface.

Alternatively, the learning phase can also comprise the following steps:
1. Setting an initial fibre feed speed, which corresponds to 60% of the circumferential speed of the screw in the fibre intake zone;
2. Setting an initial plastic mass flow, which corresponds to the maximally plasticizable plastic mass flow by the screw which is used;
3. Reducing the plastic mass flow by for example 5% of the initial plastic mass flow;
4. Repeating the previous step until the discharged fibre/plastic strand has a smooth surface.

According to a first aspect of the invention, the first and/or second mass flow target ratio can be set and preferably regulated by the speed v at which the fibre strands are fed into the single-screw extruder, and/or the rotation rate n of the screw and/or the mass flow dmK/dt of plastic material which is fed into the single-screw extruder, are set and preferably regulated so that they are in a ratio to one another at which the mass flow target ratio is present.

According to a further aspect of the invention, a nozzle with variable cross-section can be used, wherein the nozzle cross-section is set and preferably regulated in such a way that the first and/or second mass flow target ratio is present.

Preferably, the fibre-reinforced plasticate is used for the additive manufacture of a fibre-reinforced plastic component. When exclusively the plasticate produced according to the invention is used, i.e. exclusively endless-fibre-reinforced plasticate, endless-fibre-reinforced plastic components can be produced in the 3D printing method.

However, cases of application can also exist where parts of the plastic component do not have to, or are not to, be provided with a fibre reinforcement. In this case, both endless-fibre-reinforced plasticate and also non-reinforced plasticate, i.e. pure plastic melt, is required in the additive manufacture. According to a further idea of the present invention, therefore the feeding of fibre strands can be interrupted for one or more predeterminable periods of time, and in these periods of time exclusively plastic melt can be discharged from the nozzle.

Preferably here, the fibre strands can be cut off at the start of a predeterminable period of time by means of a cutting device arranged on the nozzle, and the further feed of fibre strands into the single-screw extruder can be stopped for the duration of this period of time, so that for the duration of this period of time exclusively plastic melt is discharged from the nozzle.

A device according to the invention comprises:
a single-screw extruder with a cylinder and with a screw, rotatably mounted therein and able to be driven at a variable rotation rate,
a first filling opening in the cylinder for the feeding of a plastic material into the single-screw extruder,
a second filling opening in the cylinder for the feeding of a mass flow dmF/dt of one or more endless fibre strands into the single-screw extruder, wherein the second filling opening is arranged remote from the first filling opening with regard to conveying,
a fibre feed device, which is configured to introduce one or more endless fibre strands at a predeterminable fibre feed speed into the second filling opening,
a nozzle arranged at the end of the cylinder remote with regard to conveying, via which a mixture of fibre strands and plastic melt can be discharged as fibre-reinforced plasticate, and
a control unit, which is configured to keep over predeterminable periods of time the mass flow dmF/dt in a first mass flow target ratio to a mass flow dmS/dt of plastic melt (29) exiting from the nozzle and/or over predeterminable periods of time to keep the mass flow dmF/dt in a second mass flow target ratio to a mass flow dmP/dt of fibre-reinforced plasticate exiting from the nozzle, in which the endless fibre strands exiting from the nozzle are substantially completely impregnated with plastic melt,
wherein remotely from the second filling opening with regard to conveying the screw is configured having a section with a screw geometry in which the endless fibre strands can exit substantially undamaged from the nozzle.

Preferably, the screw section remote from the second filling opening with regard to conveying is configured as a pure conveying screw and has a screw shaft with a helically circumferential screw flight, wherein a constant thread depth, a constant thread width and a constant flight width are provided. In order to be able to impregnate the fibres with plastic melt particularly efficiently, the screw section remote from the second filling opening with regard to conveying can have a screw flight form in which the driving flank is chamfered or rounded with respect to the shell surface of the screw flight. In this way, between the screw flight and the cylinder inner wall a pressure gradient is produced, which facilitates the penetrating of the plastic into the fibre intermediate spaces. So as not to shorten the fibres as much as possible during the processing, the screw section has, remotely from the second filling opening with regard to conveying, a gap size which corresponds at least to the thickness of the fed fibre strand, but preferably adopts a value of between 0.5 mm and 2.5 mm. In order to prevent fibre breakage, the transitions of the respective faces of the screw flight (driving flank, shell surface, chamfer if applicable, passive flank) can be embodied in a rounded manner.

According to an aspect to the invention, the control unit can be configured in particular to control and preferably regulate the amount of the fibre feed speed v and/or the amount of the rotation rate n of the screw in such a way that the first and/or the second mass flow target ratio can be kept constant at a predeterminable value.

According to a further aspect of the invention, a metering unit can be provided, which is configured in order to insert a predeterminable mass flow dmK/dt of plastic material into the first filling opening. The control unit can then be additionally configured to control and preferably to regulate the amount of the mass flow dmK/dt of plastic material at the metering unit in such a way that the first and/or second mass flow target ratio can be kept constant at a predeterminable value.

In further development of the invention, the nozzle can have a variable nozzle cross-section. In this case, the control unit can be additionally configured to control and preferably to regulate the nozzle cross-section in such a way that the first and/or second mass flow target ratio can be kept constant at a predeterminable value.

Furthermore, a cutting device can be provided on the nozzle, by which the fibre strands exiting from the nozzle can be cut off. Thereby it becomes possible that the fibre strands are cut off at the start of a predeterminable period of time, and the further feeding of fibre strands into the single-screw extruder is stopped for the duration of this period of time, so that for the duration of this period of time exclusively plastic melt is discharged from the nozzle. If applicable, it can also be necessary or expedient to cut through the fibre strands exiting from the nozzle and to stop the discharge of endless-fibre-reinforced plasticate for a short time, for example in order to subsequently continue at a different position with the additive production of the endless-fibre-reinforced plastic component. Ultimately, it depends on how the plasticate is to be placed in the production of an endless-fibre-reinforced plastic component.

According to the invention therefore the use of a device according to the invention for the additive manufacture of an endless-fibre-reinforced plastic component is also provided, wherein the device is mounted on a multi-axis industrial robot, by which the nozzle can be moved over a base and a strand of endless-fibre-reinforced plasticate can be deposited on the base. If applicable, both endless-fibre-reinforced plasticate and also non-reinforced plasticate can be used in the additive manufacture. For this purpose, the feeding of fibre strands can be interrupted for one or more predeterminable periods of time, and in these periods of time exclusively plastic melt can be discharged from the nozzle.

In the use of a device according to the invention for the additive manufacture of an endless-fibre-reinforced plastic component, a base can be provided, on which a strand of plasticate, exiting from the nozzle, can be deposited, wherein the base can be moved in one or more directions in space.

If applicable, a base which is movable in space can also be used together with a device according to the invention, which is mounted on a multi-axis industrial robot.

Preferably, the bases can be moved in space in one or more directions (x, y, z).

Preferably, the fibre feed speed and the relative speed between the nozzle and the deposition point of the strand are substantially identical. In the case of a fibre feed speed which is too low, a tearing off of fibre strands can occur. In the case of a fibre feed speed which is too high, the formation of a material jam on the base can occur.

If applicable, several devices according to the invention can be used simultaneously. The discharge of fibre-reinforced plasticate can then be carried out from one of the devices or simultaneously from several devices. The devices can be operated here so that according to the fibre-reinforced plastic component which is to be produced, identical or differently constructed devices are used, which according to the desired plastic component are operated respectively alternately or respectively in succession or collectively simultaneously. Here, fibre strands of different fibre material and/or different plastic material can be used.

The invention has a range of advantages compared to the prior art, some of which are to be listed below.

Instead of expensive semi-finished product (UD tape), favourably priced standard materials can be used, namely commercially available fibre strands on spools—so-called fibre rovings—and commercially available plastic granulate.

A direct deposition of the endless-fibre-reinforced plasticate enables in addition a targeted adaptation of the fibre strand depending on the component geometry. A load path optimized reinforcement of a plastic component is therefore able to be implemented at a favourable cost. Thereby, a high potential for lightweight construction is also produced, because the fibre reinforcement is only carried out where it is required.

Furthermore, the type of the fibre material and the type of the plastic, i.e. the matrix material, can be selected almost freely. Thereby, a high degree of flexibility results with respect to the material combinations in the additive manufacture of fibre-reinforced plastic components.

When a plastic component is to be constructed both from fibre-reinforced components and also from non-fibre-reinforced components, a good connection between the two components can be achieved by means of the invention, because identical matrix material or respectively plastic material is used both for the fibre-reinforced component part of the component and also for the support structure (i.e. the non-reinforced component part of the component).

BRIEF DESCRIPTION OF THE DRAWINGS

The invention is to be described more closely below with the aid of an example embodiment and with reference to the figures. There are shown:

FIG. 2 enlarged illustration of the section 30 of FIG. 1;

FIGS. 2*a*-2*d* enlarged illustration of the region X of FIG. 2 with various embodiments of the screw flight FIG. 3*a* discharge with higher plastic proportion than fibre proportion;

DESCRIPTION OF EXAMPLE EMBODIMENTS

Figure 1:
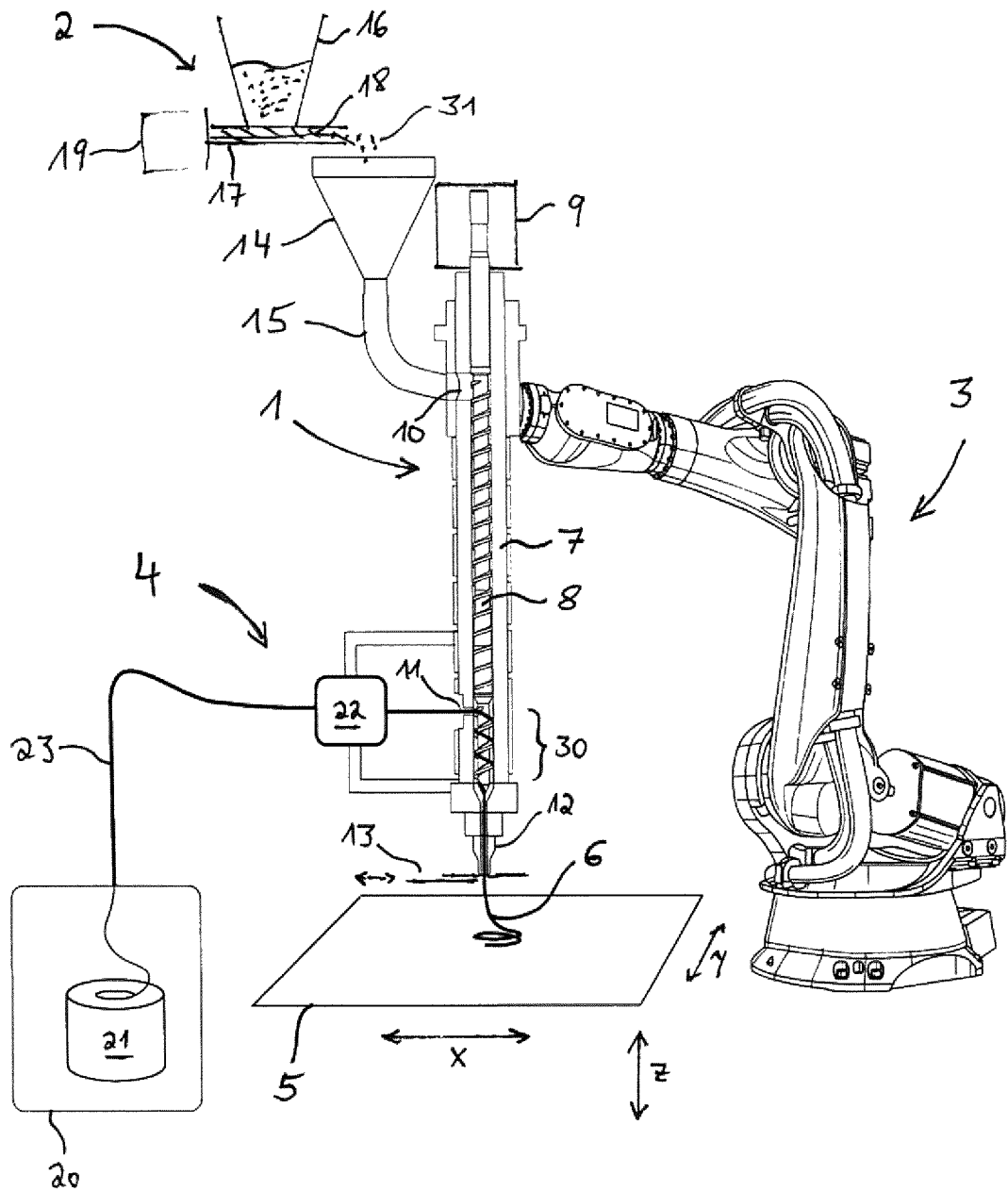
FIG. 1 perspective illustration of a device according to the invention with partial section of the extruder.

FIG. 1 shows a system for the additive manufacture of endless-fibre-reinforced plastic components. The system can also be designated as a 3D printer for the production of endless-fibre-reinforced plastic components. It comprises a single-screw extruder 1, a metering unit 2, a multi-axis industrial robot 3, a fibre feed device 4 and a base 5, on which an impregnated fibre strand 6 can be deposited. By means of the multi-axis industrial robot 3, the single-screw extruder 1 can be moved into any desired positions in space. In the illustration of FIG. 1, the single-screw extruder 1 is aligned vertically. The single-screw extruder 1 comprises a cylinder 7 and a screw 8 rotatably mounted therein, which can be driven by a rotary drive 9 with a variable and regulatable rotation rate. At the rear end of the screw 8 a first filling opening 10 is provided in the cylinder 7 for the feeding of a plastic material into the single-screw extruder 1. Remote from the first filling opening 10 with regard to conveying, a second filling opening 11 is provided for the feeding of one or more fibre strands. At the end of the cylinder 7 which is remote with respect to conveying, a nozzle 12 and a cutting device 13 are arranged. The nozzle 12 can be configured so that it has a variable nozzle cross-section. For this, the nozzle 12, in a comparable manner for example to an aperture of a camera, can have a plurality of blades, engaging into one another, arranged in a circular-shaped manner. Through the simultaneous changing of the setting angle of the blades, the flow cross-section can be enlarged or made smaller. By means of the cutting device 13, an impregnated fibre strand 6 can be cut off. If applicable, the cutting device 13 can also be equipped with a sealing element, in order to be able to close the outlet opening of the nozzle 12 for a short time, for example when the discharge is to be stopped at one position and is to be continued at another position. The feeding of plastic material into the cylinder 7 takes place via a filling hopper 14 and a pipe 15. The plastic material is preferably fed into the filling hopper 14 by means of the metering unit 2. The metering unit 2 comprises a material hopper 16, a conveying cylinder 17, a conveying screw 18 and a metering drive 19. The fibre feed device 4 comprises a fibre storage container 20 with one or more fibre spools 21 and a fibre braking arrangement 22. By means of the fibre braking arrangement 22 the speed v can be regulated at which a fibre strand 23 is drawn into the cylinder 7 via the filling opening 11. The base 5 can be moved, if applicable, in space, as is indicated by the arrows x, y and z. Such a positioning device is known in itself and therefore does not need to be described in closer detail at this point.

The screw 8 can be formed in a manner known per se in the region between the first filling opening 10 and the second filling opening 11, in order to be able to melt the fed plastic material and convey it in the direction of the nozzle 12. Here, a variety of embodiments of screws known from the prior art can be used. The concern is only that the plastic material, on reaching the second filling opening 11 is sufficiently melted so that the fibre strand 23 can be fed into the plastic melt and impregnated with plastic melt.

Remote from the second filling opening 11 with regard to conveying, the screw 8 is formed as a pure conveying screw, as can be seen in FIG. 2 on an enlarged scale. In particular, the screw 8 is configured in this region as a screw shaft 24 with a helically circumferential screw flight 25. In this region, the screw 8 has a constant thread depth 26 (see FIG. 2a), a constant thread width 27 and a constant flight width 28. With this configuration of the screw 8—together with the operation of the single-screw extruder 1 described in further detail below—it is ensured that the fibre strand 23 can be discharged substantially undamaged out of the nozzle 12. In order to be able to impregnate the fibres with plastic melt particularly efficiently, the screw section can have, remote from the second filling opening with regard to conveying, a screw flight form in which the driving flank is chamfered (FIG. 2b) or rounded (FIG. 2c) with respect to the shell surface of the screw flight. In this way, between the screw flight and the cylinder inner wall a pressure gradient is produced, which facilitates the penetrating of the plastic into the fibre intermediate spaces. So as not to shorten the fibres as much as possible during the processing, the screw section has, remote from the second filling opening with regard to conveying, a gap measurement which corresponds at least to the thickness of the fed fibre strand, preferably, however, adopts a value of between 0.5 mm and 2.5 mm (FIG. 2, 2a, 2b, 2c, 2d). In order to prevent fibre breakage, the transitions of the respective faces of the screw flight (driving flank, shell surface, chamfer if applicable, passive flank) can be rounded (FIG. 2d).

The operation of the system illustrated in FIGS. 1 and 2 is to be described below. By means of the metering unit 2, a regulated feed of plastic material into the cylinder 7 can take place, by the mass flow dmK/dt of plastic material which is fed to the cylinder 7 being regulated by means of the metering drive 19. With the rotary drive 9 the rotation rate n of the screw 7 can be regulated. By means of the fibre braking arrangement 22, the speed v can be regulated at which the fibre strand 23 is fed into the cylinder 7 and thus into the plastic melt. On exit from the nozzle, a mass flow dmF/dt of fibre strand exiting form the nozzle 12 and a mass flow dmS/dt of plastic melt exiting from the nozzle 12 is therefore present. By means of the control variables "mass flow dmK/dt of plastic material" and "rotation rate n of the screw", the mass flow dmS/dt of plastic melt exiting from the nozzle 12 can be regulated. By means of the fibre braking arrangement 22, the mass flow dmF/dt of fibre strand exiting from the nozzle 12 can be regulated. According to a core idea of the present invention, an operating state is set and preferably also regulated, at which the mass flow dmF/dt of fibre strands exiting from the nozzle 12 (only a single fibre strand in FIG. 1), and the mass flow dmS/dt of plastic melt exiting from the nozzle are in a ratio to one another such that the fibre strands exiting from the nozzle 12, here therefore the fibre strand 6, are substantially completely impregnated by plastic melt. This ratio constitutes a mass flow target ratio which is to be kept substantially constant, in order to achieve good results in the additive manufacture of an endless-fibre-reinforced plastic component. During operation of the systems with the mass flow target ratio an endless-fibre-reinforced plasticate is discharged from the nozzle 12, which is particularly well suited for the additive manufacture of an endless-fibre-reinforced plastic component.

Figure 3A:
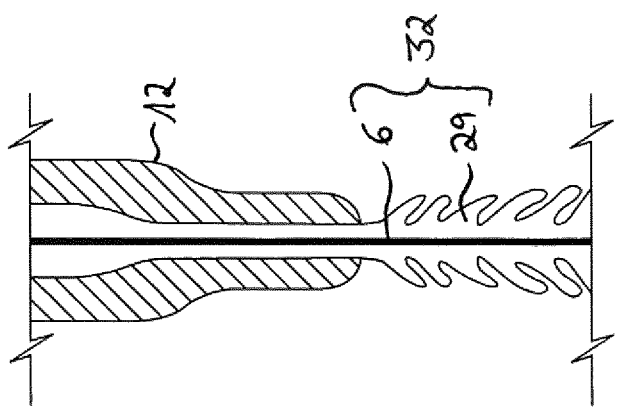
FIG. 3*b* discharge with higher fibre proportion than plastic proportion.
FIG. 3*c* discharge with correct ratio of mass flow of fibre material and mass flow of plastic melt.
Figure 3B:
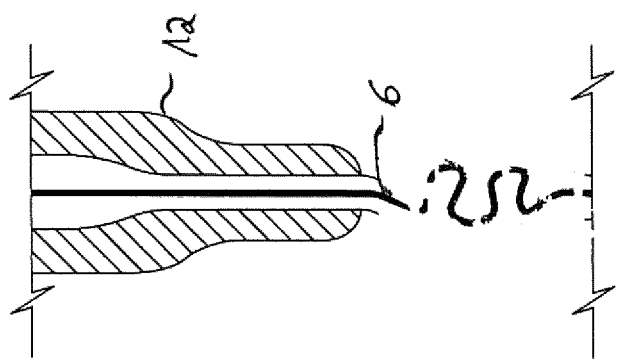
Figure 3C:
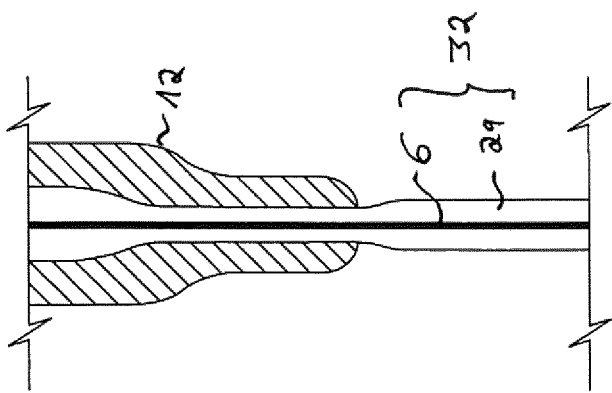

In FIGS. 3a to 3c it is illustrated how the endless-fibre-reinforced plasticate 32 is discharged from the nozzle 12 in different operating states of the system. FIG. 3a shows a state in which more plastic melt than fibre material is discharged, and FIG. 3b shows a state in which more fibre material than plastic melt is discharged. In FIG. 3c, a state is illustrated in which the mass flow target ratio is present. In FIG. 3a the fibre strand is not only impregnated with plastic melt 29, but additional plastic melt 29 around the fibre strand 6 is discharged. In FIG. 3b, only an incompletely impregnated fibre strand 6 is discharged. This is intended to be indicated by the non-continuous black illustration of the fibre strand 6. In FIG. 3c a fibre strand 6, which is completely impregnated with plastic melt 29, is discharged. For the sake of clarity, in FIG. 3c the fibre strand 6 is illustrated as being encased with plastic melt 29. In reality, however, the fibre strand 6 is penetrated by plastic melt. It can also be stated that the fibre strand 6 in FIG. 3c is completely impregnated with plastic melt 29. Ideally, a thin surface layer of pure plastic material 29 is present, which surrounds the impregnated fibre strand 6.

By means of the method according to the invention, it is thus prevented that more plastic melt than fibre material (FIG. 3a) or more fibre material than plastic melt (FIG. 3b) than desired is discharged from the nozzle 12.

When only a single endless fibre stand, impregnated with plastic melt, is to be discharged from the nozzle, the setting of the mass flow target ratio can take place such that the fibre strand exiting from the nozzle has a surface which is smooth and is coated with plastic melt.

The mass flow target ratio can preferably be determined in an upstream learning phase.

If a nozzle 12 with a variable nozzle cross-section is used, the nozzle cross-section can also be used as control variable for the mass flow target ratio. Here, the nozzle cross-section is set and regulated such that the mass flow target ratio is present.

For the additive production of an endless-fibre-reinforced plastic component, the nozzle 12 can be moved relative to the base 5 according to a predetermined program. For this, the base 5 and/or the single-screw extruder 1 can be moved in space so that the endless-fibre-reinforced plasticate 32 or respectively the impregnated endless fibre strand 6 is deposited on the base 5 according to the data of the plastic component.

If a plastic component is to be produced, where parts of the plastic component do not have to, or are not to, be provided with a fibre reinforcement, both endless-fibre-reinforced plasticate 32 and also non-reinforced plasticate, i.e. pure plastic melt 29, is discharged from the nozzle 12. For this, the feed of the fibre strand 23 can be interrupted for one or more predeterminable periods of time, and in these periods of time exclusively plastic melt 29 can be discharged from the nozzle 12. The cutting off of the fibre strand 6 can take place by means of the cutting device 13 arranged on the nozzle 12. The fibre strand 6 is cut off at the start of a predeterminable period of time and the further feed of fibre strand 23 into the single-screw extruder 1 is stopped for the duration of this period of time, so that for the duration of this period of time exclusively plastic melt 29 is discharged from the nozzle 12.

Depending on the case of application, only a single dry fibre strand 23 can be used, as is the case in the example embodiment of FIG. 1. Here, the mass flow target ratio can be set and preferably regulated such that the impregnated fibre strand 6 exiting from the nozzle 12 has a surface which is smooth and is coated with plastic melt 29.

LIST OF REFERENCE NUMBERS 1 single-screw extruder
2 metering unit
3 multi-axis industrial robot
4 fibre feed device
5 base
6 fibre strand—impregnated
7 cylinder
8 screw
9 rotary drive
10 first filling opening for plastic material
11 second filling opening for fibre material
12 nozzle
13 cutting device
14 filling hopper
15 pipe
16 material hopper
17 conveying cylinder
18 conveying screw
19 metering drive
20 fibre storage container
21 fibre spool
22 fibre braking arrangement
23 fibre strand
24 screw shaft
25 screw flight
26 thread depth
27 thread width
28 flight width
29 plastic melt
30 conveying screw
31 plastic granulate
32 fibre-reinforced plasticate

What is claimed is:

1. A method for the production of a fibre-reinforced plasticate by means of a single-screw extruder (1), having a cylinder (7) and a screw (8) mounted rotatably therein, wherein a plastic material (31) is fed via a first filling opening (10) in the cylinder (7) into the single-screw extruder (1) and is melted therein to a plastic melt, wherein remotely from the first filling opening (10) with regard to conveying, a mass flow dmF/dt of one or more endless fibre strands (23) is fed via a second filling opening (11) in the cylinder (7) into the single-screw extruder (1), wherein in the region of the second filling opening (11) the plastic material (31) is present as plastic melt, wherein the endless fibre strands (23) are introduced in dry state into the plastic melt and are impregnated with plastic melt, wherein the mixture of fibre strands and plastic melt is discharged as fibre-reinforced plasticate (32) from a nozzle (12) situated at the remote end of the cylinder (7) with regard to conveying, wherein the screw (8) is used which, remote from the second filling opening (11) with regard to conveying, has a screw geometry such that the fed endless fibre strands (23) exit from the nozzle (12) substantially undamaged and impregnated with plastic melt (29), wherein a mass flow dmS/dt of plastic melt exiting from the nozzle and a mass flow dmP/dt of fibre-reinforced plastic (32) exiting from the nozzle are present, wherein the mass flow dmF/dt and the mass flow dmS/dt are in a first ratio to one another, in which the endless fibre strands (6) exiting from the nozzle (12) are substantially completely impregnated with plastic melt, wherein this first ratio constitutes a first mass flow target ratio, which is kept substantially constant over predeterminable periods of time, and/or wherein the mass flow dmF/dt and the mass flow dmP/dt are in a second ratio to one another, in which the endless fibre strands (6) exiting from the nozzle (12) are substantially completely impregnated with plastic melt, wherein the second ratio constitutes a second mass flow target ratio which is kept substantially constant over predeterminable periods of time.

2. The method according to claim 1,
wherein
the first mass flow target ratio or the second mass flow target ratio is determined in an upstream learning phase.

3. The method according to claim 1,
wherein
the first or the second mass flow target ratio is set and regulated by the speed v at which the fibre strands (23) are fed into the single-screw extruder (1), and/or the rotation rate n of the screw (7) and/or the mass flow dmK/dt of plastic material (31), which is fed into the single-screw extruder (1), are set and regulated such that they are in a ratio to one another in which the mass flow target ratio is present.

4. The method according to claim 1,
wherein
the nozzle (12) with variable nozzle cross-section is used and that the nozzle cross-section is set and regulated such that the first or second mass flow target ratio is present.

5. The method according to claim 1,
wherein
the fibre-reinforced plasticate (32) is used for the additive manufacture of a fibre-reinforced plastic component.

6. The method according to claim 5,
wherein
the feed of fibre strands (23) is interrupted for one or more predeterminable periods of time and in these periods of time exclusively plastic melt (29) is discharged from the nozzle (12), wherein the first or second mass flow target ratio is present only in the feed of fibre strands (23).

7. The method according to claim 6,
wherein
by means of a cutting device (13) arranged on the nozzle (12), the impregnated fibre strands (6) are cut off at the start of a predeterminable period of time, and the further feed of dry fibre strands (23) into the single-screw extruder (1) is stopped for the duration of this period of time, so that for the duration of this period of time exclusively plastic melt (29) is discharged from the nozzle (12).

8. The method according to claim 1,
wherein
several fibre strands (23) are used, and that the first or second mass flow target ratio is set and regulated such that the impregnated fibre strands (6) exiting from the nozzle (12) respectively have a surface which is coated with plastic melt (29) and is smooth.

9. The method according to claim 1,
wherein
a single fibre strand (23) is used and that the first or second mass flow target ratio is set and reregulated such that the impregnated fibre strand (6) exiting from the nozzle (12) has a surface which is coated with plastic melt (29) and is smooth.

10. A device for carrying out the method according to claim 1, comprising:
a single-screw extruder (1) with a cylinder (7) and with the screw (8), mounted rotatably therein and drivable at a variable rotation rate,
a first filling opening (10) in the cylinder (7) for the feed of a plastic material (31) into the single-screw extruder (1),
a second filling opening (11) in the cylinder (7) for the feed of a mass flow dmF/dt of one or more endless fibre strands (23) into the single-screw extruder (1), wherein the second filling opening (11) is arranged remote from the first filling opening (10) with regard to conveying,
a fibre feed device (4), which is configured to introduce one or more endless fibre strands (23) at a predeterminable fibre feed speed into the second filling opening (11),
the nozzle (12) arranged at the end of the cylinder (7) which is remote with regard to conveying, via which a mixture of fibre strands and plastic melt can be discharged as fibre-reinforced plasticate (32), and
a control unit, which is configured to keep the mass flow dmF/dt over predeterminable periods of time in a first mass flow target ratio to a mass flow dmS/dt of plastic melt (29) exiting from the nozzle (12) or to keep the mass flow dmF/dt over predeterminable periods of time in a second mass flow target ratio to a mass flow dmP/dt of fibre-reinforced plastic (32) exiting from the nozzle, in which the endless fibre strands (6) exiting from the nozzle (12) are substantially completely impregnated with plastic melt,
wherein the screw (8) remote from the second filling opening (11) with regard to conveying has a section (30) formed with a screw geometry in which the endless fibre strands (23) can exit substantially undamaged from the nozzle (12).

11. The device according to claim 10,
wherein
the screw section (30) is configured as a conveying screw (30) and has a screw shaft (24) with a helically circumferential screw flight (25), wherein a constant thread depth (26), a constant thread width (27) and a constant flight width (28) are provided.

12. The device according to claim 10,
wherein
the control unit is configured to control and regulate the amount of fibre feed speed v and/or the amount of the rotation rate n of the screw (8) such that the first mass flow target ratio and/or the second mass flow target ratio can be kept constant at a predeterminable value.

13. The device according to claim 10,
wherein
a metering unit (2) is provided, which is configured in order to feed a predeterminable mass flow dmK/dt of plastic material (31) into the first filling opening, and wherein the control unit is configured to control and regulate the amount of the mass flow dmK/dt of plastic material (31) at the metering unit (2) such that the first and/or second mass flow target ratio can be kept constant at a predeterminable value.

14. The device according to claim 10,
wherein
the nozzle (12) has a variable nozzle cross-section and that the control unit is configured to control and regulate the nozzle cross-section such that the first and/or second mass flow target ratio can be kept constant at a predeterminable value.

15. The device according to claim 10,
wherein
on the nozzle (12) a cutting device (13) is provided, by which the fibre strands (6) exiting from the nozzle (12) can be cut off.

16. A use of a device according to claim 10 for the additive manufacture of a fibre-reinforced plastic component, wherein the device is mounted on a multi-axis industrial robot (3), by which the nozzle (12) is moved over a base (5) and a strand of fibre-reinforced plasticate (32) can be deposited on the base (5).

17. The use of a device according to claim 10 for the additive manufacture of a fibre-reinforced plastic component, wherein a base (5) is provided, on which a strand of fibre-reinforced plasticate (32) exiting from the nozzle (12) can be deposited, wherein the base (5) can be moved in space in one or more directions (x, y, z).

18. The use according to claim 16
wherein
the fibre feed speed and the relative speed between the nozzle (12) and the deposition point of the strand are substantially identical.

19. The use according to claim 16, wherein several devices are used simultaneously, wherein the discharge of fibre-reinforced plasticate (32) is carried out from one of the devices or simultaneously from several devices.

20. The use according to claim 19, wherein fibre strands of different material and/or different plastic material are used in each or some of the several devices.

* * * * *